(12) United States Patent
Lan

(10) Patent No.: US 9,503,418 B2
(45) Date of Patent: Nov. 22, 2016

(54) METHOD AND APPARATUS FOR OBTAINING REMOTE IP ADDRESS

(71) Applicant: Huawei Technologies Co., Ltd., Shenzhen (CN)

(72) Inventor: Haiqing Lan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 254 days.

(21) Appl. No.: 13/675,860

(22) Filed: Nov. 13, 2012

(65) Prior Publication Data

US 2013/0073699 A1 Mar. 21, 2013

Related U.S. Application Data

(63) Continuation of application No. PCT/CN2011/073731, filed on May 6, 2011.

(30) Foreign Application Priority Data

May 13, 2010 (CN) .......................... 2010 1 0175907

(51) Int. Cl.
*H04L 29/12* (2006.01)
*H04L 12/28* (2006.01)
*G06F 15/177* (2006.01)

(52) U.S. Cl.
CPC ....... *H04L 61/2015* (2013.01); *H04L 12/2859* (2013.01); *H04L 61/2053* (2013.01)

(58) Field of Classification Search
CPC ........... H04L 29/1232; H04L 29/12283; H04L 67/04; H04L 29/06; H04L 61/2015; H04L 12/2859; H04L 61/2053
USPC ......... 709/227, 250, 224, 220–222; 370/325, 370/389, 401, 216, 254, 331; 702/122
See application file for complete search history.

(56) References Cited

U.S. PATENT DOCUMENTS 6,958,996 B2 * 10/2005 Xiong ........................... 370/389
7,277,814 B1 * 10/2007 Shand ........................... 702/122
(Continued)

FOREIGN PATENT DOCUMENTS

CN        1960380 A      5/2007
CN      101001253 A      7/2007
(Continued)

OTHER PUBLICATIONS

Jenq-Haur Wang, Remote Host Configuration Protocol: Configuring a Remote Host in a User-Friendly Manner, Feb. 18, 1998, National Taiwan University. 12 pages.*

(Continued)

*Primary Examiner* — David Lazaro
*Assistant Examiner* — Zi Ye
(74) *Attorney, Agent, or Firm* — Brinks Gilson & Lione

(57) ABSTRACT

A method and an apparatus for obtaining a remote Internet Protocol (IP) address are provided. The method includes: receiving, by a first client, a first detection IP packet from a remote server through a Point to Point Protocol (PPP) interface, in which the first detection IP packet carries a first IP address allocated by the remote server for the first client; and configuring the first IP address to be an IP address of the first client. Through the method and the apparatus, the remote server is capable of allocating a remote IP address of a client.

9 Claims, 9 Drawing Sheets

(56) References Cited

U.S. PATENT DOCUMENTS

| | | | |
|---|---|---|---|
| 7,373,407 B2 * | 5/2008 | Nyu | H04L 12/66 709/227 |
| 7,633,898 B2 | 12/2009 | Jain et al. | |
| 7,640,287 B1 | 12/2009 | Gai et al. | |
| 7,657,642 B2 | 2/2010 | Blanchet | |
| 7,706,301 B2 * | 4/2010 | Petrescu et al. | 370/254 |
| 7,756,008 B2 * | 7/2010 | Bellovin | 370/216 |
| 2006/0002324 A1 * | 1/2006 | Babbar et al. | 370/325 |
| 2007/0101121 A1 * | 5/2007 | Henry et al. | 713/151 |
| 2007/0189311 A1 * | 8/2007 | Kim et al. | 370/401 |
| 2007/0195804 A1 | 8/2007 | Ijima et al. | |
| 2007/0291689 A1 * | 12/2007 | Kapur et al. | 370/328 |
| 2008/0144639 A1 * | 6/2008 | Binet et al. | 370/401 |
| 2009/0129386 A1 | 5/2009 | Rune | |
| 2009/0240792 A1 | 9/2009 | Ren | |
| 2010/0118831 A1 * | 5/2010 | Chen et al. | 370/331 |

FOREIGN PATENT DOCUMENTS

| | | |
|---|---|---|
| CN | 101199166 A | 6/2008 |
| CN | 101202767 A | 6/2008 |
| CN | 101651722 A | 2/2010 |

OTHER PUBLICATIONS

International Search Report issued in corresponding PCT Patent Application No. PCT/CN2011/073731, mailed Aug. 4, 2011.
Written Opinion of the International Searching Authority issued in corresponding PCT Patent Application No. PCT/CN2011/073731, mailed Aug. 4, 2011.
Extended European Search Report issued in corresponding European Patent Application No. 11780175.3, mailed Jun. 5, 2013, 6 pages.
Office Action issued in corresponding Chinese Patent Application No. 201010175907.3, mailed May 30, 2013, 9 pages.

* cited by examiner

METHOD AND APPARATUS FOR OBTAINING REMOTE IP ADDRESS

CROSS-REFERENCE TO RELATED APPLICATIONS

This application is a continuation of International Application No. PCT/CN2011/073731, filed on May 6, 2011, which claims priority to Chinese Patent Application No. 201010175907.3, filed on May 13, 2010, both of which are hereby incorporated by reference in their entireties.

FIELD OF THE INVENTION

The present invention relates to the field of communications technologies, and more particularly to a method and an apparatus for obtaining a remote Internet Protocol address.

BACKGROUND OF THE INVENTION

An Internet Protocol (Internet Protocol, IP) address may be used as an Identifier (ID) of a user equipment and an ID of a network apparatus in an IP network, and may also be used as an ID for forwarding of an IP packet; therefore, configuration of the IP address is a core of an entire IP network. The IP address includes an IPv4 address and an IPv6 address. Taking the IPv4 address as an example, the IPv4 address is an address with 32-bit binary code, and includes a network ID and a host ID. Different network IDs are configured for network segments of different gateways, and all the hosts with the same network ID are mounted under the same network segment of the same gateway. Therefore, the IP address is not only uniquely configured, but also a corresponding network ID needs to be planned according to the network segment of an accessed gateway.

One of the current networking manners is as follows: a host is connected to an access router by using a Point to Point Protocol (PPP), in which the access router is a router located on a network periphery (edge), and the host communicates with remote servers located on different network segments through the access router. A PPP interface of the host has an IP address of the PPP interface. The IP address of the PPP interface of the host is directly allocated for the host by an upper-level apparatus of the host such as a router through PPP negotiation in current bearer network deployment, or an IP address management system of a bearer network indicates that the router allocates the IP address of the PPP interface for the host through the PPP. In addition, in many fields, the host needs to be managed by a special server, and the server identifies the host through a maintenance IP address and further maintains the host.

The inventors find that the prior art at least has the following problem that a client may not automatically obtain the maintenance IP address allocated by the remote server.

SUMMARY OF THE INVENTION

Embodiments of the present invention provide a method and an apparatus for obtaining a remote IP address, so as to implement remote obtaining of an IP address.

A method for obtaining a remote IP address provided in an embodiment of the present invention includes:

receiving, by a first client, a first detection IP packet from a remote server through a PPP interface, in which the first detection IP packet carries a first IP address allocated by the remote server for the first client; and configuring the first IP address to be an IP address of the first client.

An apparatus for obtaining a remote IP address provided in an embodiment of the present invention is located in a first client, and includes:

a receiving module, configured to receive a first detection IP packet from a remote server through a PPP interface, in which the first detection IP packet carries a first IP address allocated by the remote server for the first client; and a first address configuration module, configured to configure the first IP address to be an IP address of the first client.

It may be seen from the foregoing technical solutions that, in the embodiments of the present invention, the IP address allocated by the remote server is carried in the detection IP packet, and then the detection IP packet is transmitted to a client, which thereby implements the allocation of the remote IP address by the remote server for the client.

BRIEF DESCRIPTION OF THE DRAWINGS

To illustrate the technical solutions according to the embodiments of the present invention more clearly, the accompanying drawings for describing the embodiments are introduced briefly in the following. Apparently, the accompanying drawings in the following description are some embodiments of the present invention, and persons skilled in the art may derive other drawings from the accompanying drawings without creative efforts.

DETAILED DESCRIPTION OF THE EMBODIMENTS

In order to make the objective, technical solutions, and advantages of the embodiments of the present invention clearer, the technical solutions of the embodiments of the present invention are clearly and completely described in the following with reference to the accompanying drawings in the embodiments of the present invention. It is obvious that the embodiments to be described are a part rather than all of the embodiments of the present invention. All other embodiments obtained by persons skilled in the art based on the embodiments of the present invention without creative efforts shall fall within the protection scope of the present invention.

Figure 1:
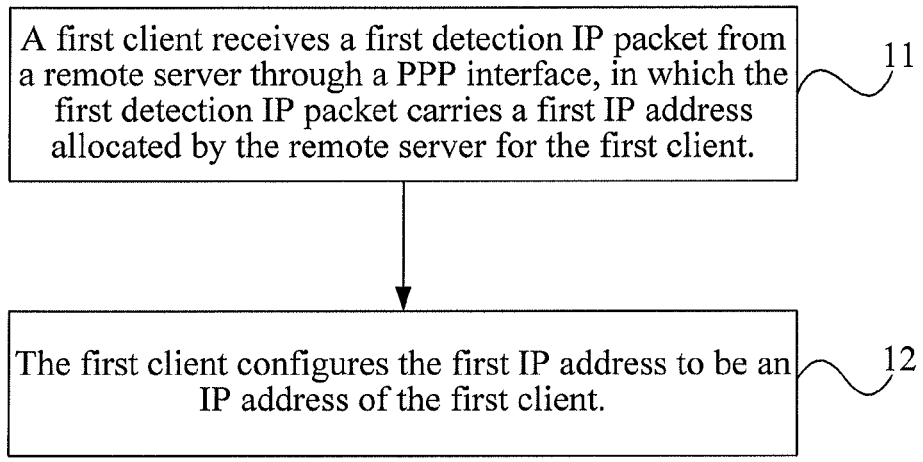
FIG. 1 is a schematic flow chart of a method according to Embodiment 1 of the present invention.

FIG. 1 is a schematic flow chart of a method according to Embodiment 1 of the present invention, which includes the following steps:

Step 11: A first client receives a first detection IP packet from a remote server through a PPP interface, in which the first detection IP packet carries a first IP address allocated by the remote server for the first client.

The detection IP packet, generated by the remote server, carries the IP address allocated by the remote server for the client, and may also carry routing information, for example, a gateway IP address or a network mask.

Step 12: The first client configures the first IP address to be an IP address of the first client.

The remote server and the first client are located in different network segments. In specific implementation, the remote server may be configured to maintain or manage the first client.

The automatic allocation solution of the remote IP address provided in the foregoing embodiment may be referred to as a Remote Host Configuration Protocol (RHCP), the process of obtaining the IP address by using the RHCP may be referred to as an RHCP process, and the remote server and the client that use the RHCP solution are respectively an RHCP server and an RHCP client.

The method is further described in the following by taking the case that the remote server allocates a maintenance IP address as an example, and the IP address allocation solutions in other application scenarios may be executed with reference to the case.

In the specific implementation, the first client may obtain the IP address through the RHCP process.

However, in a certain case, after the client obtains the IP address through the RHCP process, a Dynamic Host Configuration Protocol (DHCP) process may be further performed, which is called an RHCP+DHCP process for short, and a server and a client corresponding to the process are respectively an RHCP+DHCP server and an RHCP+DHCP client. The scenario where the RHCP+DHCP process is performed may be as follows:

For example, in case one, the client has a lower-level client cascaded to the client, and the remote server needs to allocate the maintenance IP address for the lower-level client through the client. At this time, the client may receive the detection IP packet transmitted from an upper-level apparatus to other clients (lower-level clients), and in order to avoid an allocation error of the maintenance IP address, the DHCP process may be performed at this time.

Alternatively, in case two, when the client needs legality authentication, because merely a DHCP server has legality authentication function, the DHCP process may be performed at this time.

The embodiments corresponding to different application scenarios are provided in the following. For example, a scenario for Embodiment 2 is that, the client is connected to an access router through the PPP, and the RHCP process is required. A scenario for Embodiment 3 is that, the client is connected to the access router through the PPP, and the RHCP+DHCP process is required. A scenario for Embodiment 4 is that, two clients are cascaded, in which an upper-level client is connected to the access router through the PPP, and the lower-level client accesses the upper-level client through the PPP. A scenario for Embodiment 5 is that, two clients are cascaded, in which the upper-level client is connected to the access router through the PPP, and the lower-level client accesses the upper-level client through the Ethernet. Finally, in order to reflect compatibility of multiple IP address allocation solutions, Embodiment 6 further provides a mechanism including judgment.

Each embodiment is specifically described in the following.

Figure 2:
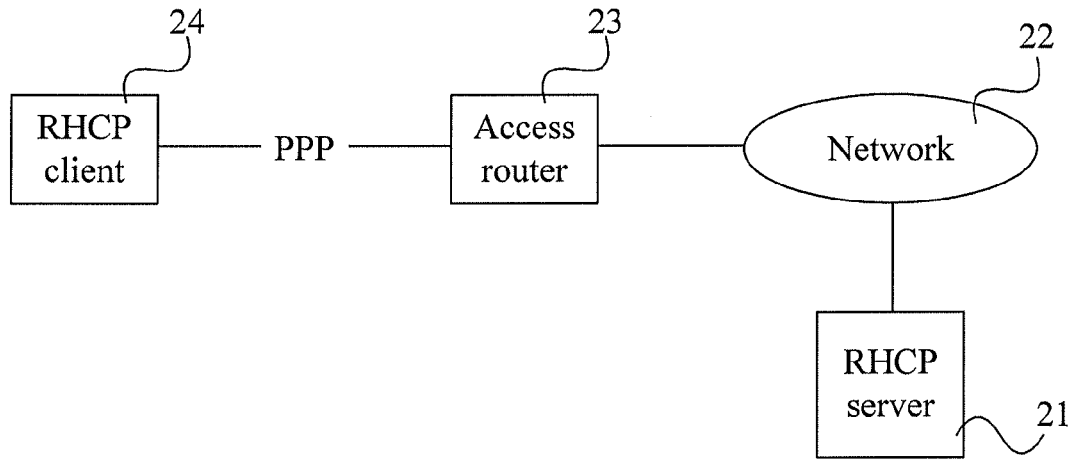
FIG. 2 is a schematic structural diagram of a system according to Embodiment 2 of the present invention.

FIG. 2 is a schematic structural diagram of a system according to Embodiment 2 of the present invention, which includes an RHCP server 21, a network 22, an access router 23, and an RHCP client 24. The RHCP server 21 is a remote server, and is connected to the access router 23 through the network 22. The RHCP client 24 establishes a PPP connection with the access router 23.

A corresponding relation between a maintenance IP address of the RHCP and a client ID is stored in the access router 23 in advance, so that a received detection IP packet generated by the RHCP server is to be forwarded to a corresponding client. In FIG. 2, a client is taken as an example, and it may be understood that, a plurality of clients may be connected to the access router.

Figure 3:
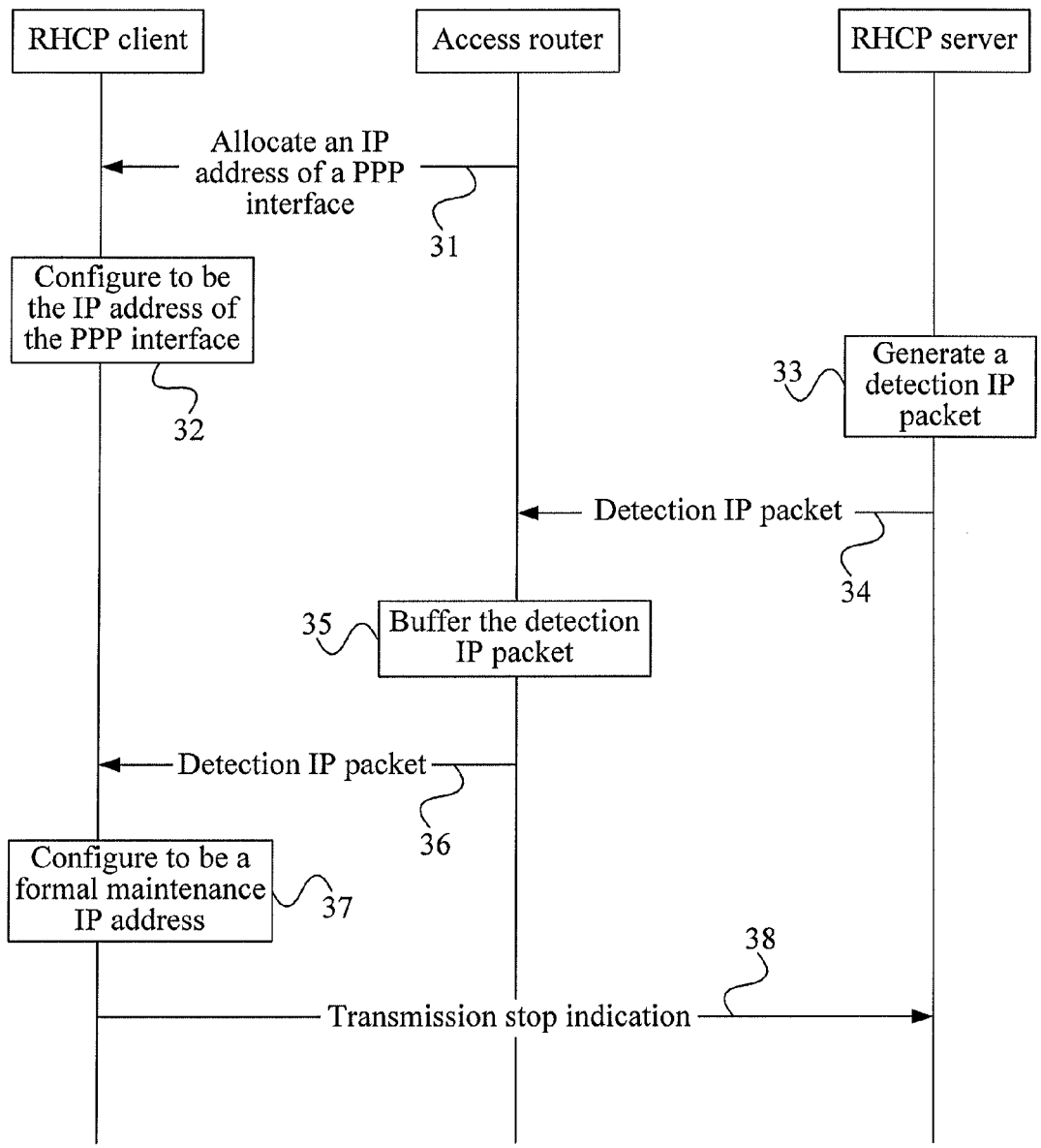
FIG. 3 is a schematic flow chart of a method according to Embodiment 2 of the present invention.

An interaction flow between the foregoing apparatuses is as shown in FIG. 3.

FIG. 3 is a schematic flow chart of a method according to Embodiment 2 of the present invention, which includes the following steps:

Step 31: An access router allocates an IP address of a PPP interface for an RHCP client.

Step 32: The RHCP client configures a received IP address allocated by the access router to be the IP address of the PPP interface.

A PPP connection is established by configuring the IP address of the PPP interface, and afterwards, the client may receive an IP packet forwarded by the access router through the PPP interface.

Step 33: An RHCP server generates a detection IP packet.

A destination IP address of a header of the detection IP packet may be a maintenance IP address allocated by the RHCP server for the client, and a source IP address is an IP address of the RHCP server. It may be understood that, the maintenance IP address may also be carried in a payload region of the detection IP packet.

The detection IP packet may also carry routing information, such as a gateway IP address, and a network mask of a network segment of the client of the maintenance IP address to be allocated.

Step 34: The RHCP server transmits the detection IP packet to the access router.

The RHCP server may periodically transmit the detection IP packet.

Step 35: The access router buffers the received detection IP packet.

The step is optional, and the access router may also directly forward the received detection IP packet.

Step 36: The access router forwards the detection IP packet to the RHCP client through the PPP interface.

A routing table may be configured in the access router in advance, and the routing table stores a corresponding relation between the maintenance IP address and the client ID (for example, the IP address of the PPP interface). Therefore, the router may forward the detection IP packet to a corresponding RHCP client according to the routing table and a destination IP address of the detection IP packet.

Step 37: The RHCP client obtains the maintenance IP address allocated by the RHCP server, and configures an allocated maintenance IP address to be a formal maintenance IP address.

Because the detection IP packet carries the maintenance IP address allocated by the RHCP server, the RHCP client may obtain the maintenance IP address from the detection IP packet. At the same time, the detection IP packet may also carry the routing information such as the gateway IP address, the network mask, and the IP address of the RHCP server, and therefore, after receiving the detection IP packet, the RHCP client may also obtain other routing information and configure corresponding routing information.

By now, the RHCP client obtains the maintenance IP address, and implements remote obtaining of the maintenance IP address.

Further, the method provided by this embodiment may also include the following step: after obtaining the maintenance IP address, the RHCP client indicates that the RHCP server stops the transmission of the detection IP packet.

The RHCP client may transmit the transmission stop indication to the RHCP server through the router according to the gateway IP address and the IP address of the RHCP server that are in the received detection IP packet.

Because the RHCP server may periodically transmit the detection IP packet, repeated allocation of an address may be avoided by transmitting the transmission stop indication.

Step 38: The RHCP client transmits the transmission stop indication to the RHCP server, so that the RHCP server stops transmitting the detection IP packet to the client after receiving the transmission stop indication.

The RHCP client and the RHCP server may determine an ID of the transmission stop indication in advance, so that the RHCP client carries the ID when transmitting the transmission stop indication, and the RHCP server determines the transmission stop indication according to the ID. In addition, the transmission stop indication may also carry the ID of the RHCP client, such as an IP address of the client, so that the RHCP server knows for which RHCP client the transmission of the detection IP packet needs to be stopped.

In this embodiment, the remote server generates the detection IP packet through the RHCP process, and forwards the detection IP packet to the client through the router, so that the client obtains the maintenance IP address from the detection IP packet, which thereby implements the obtaining of the maintenance IP address.

Figure 4:
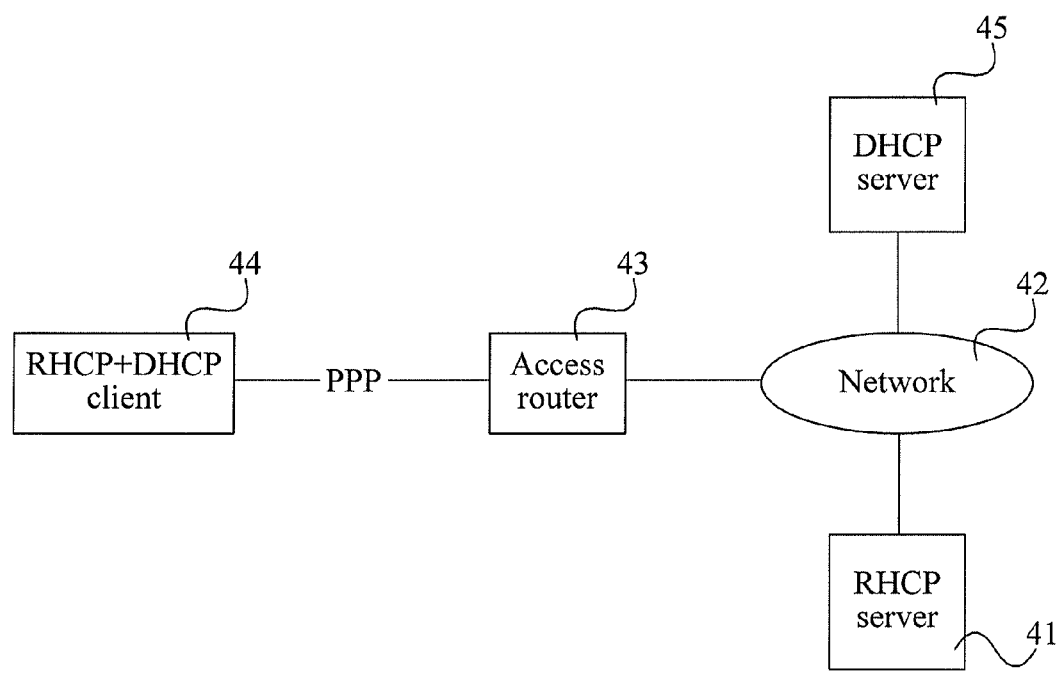
FIG. 4 is a schematic structural diagram of a system used in Embodiment 3 of the present invention.

In another application scenario, for example, when the client receives the maintenance IP address allocated by the remote server for other clients, or legitimacy authentication is required, the method may further include a DHCP process. The process is described as follows;

FIG. 4 is a schematic structural diagram of a system used in Embodiment 3 of the present invention, which includes an RHCP server 41 as a remote server, a network 42, an access router 43, an RHCP+DHCP client 44, and a DHCP server 45. In this embodiment, the RHCP server and the DHCP server are, for example, different physical entities, and it may be understood that, the RHCP server and the DHCP server may also be the same physical entity. In FIG. 4, a client is taken as an example, and it may be understood that, a plurality of clients may be connected to the access router.

Figure 5:
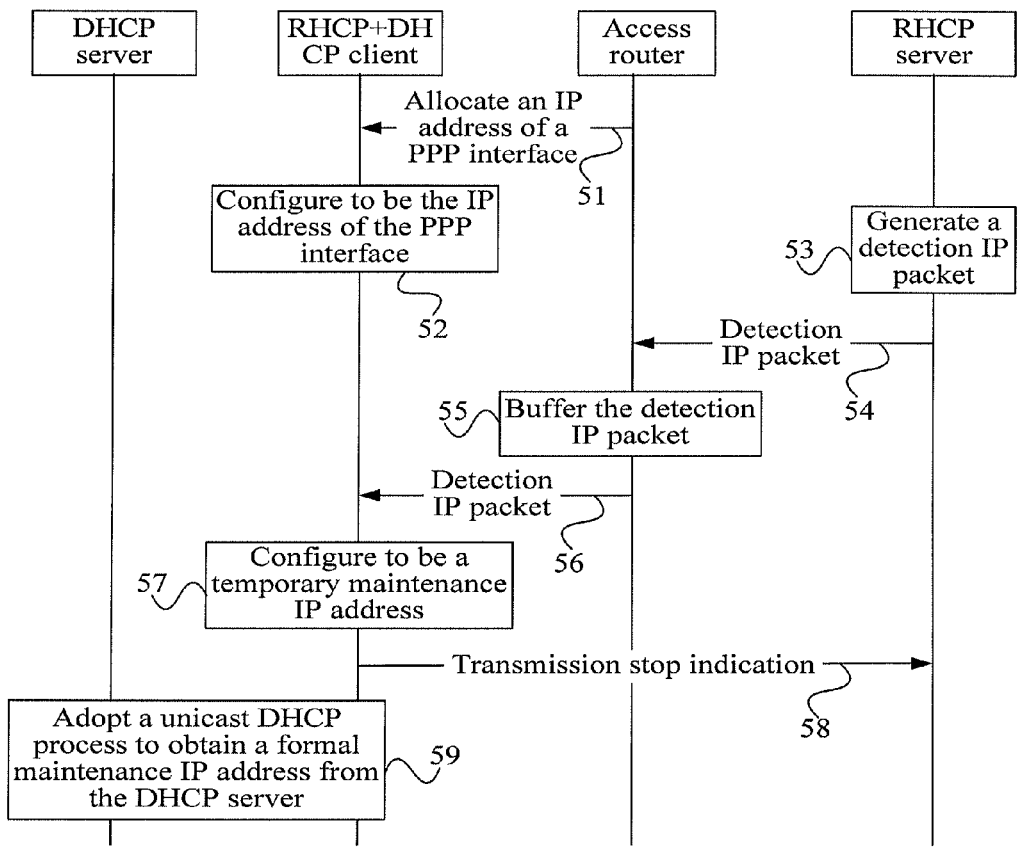
FIG. 5 is a schematic flow chart of a method according to Embodiment 3 of the present invention.

The interaction flow between the foregoing apparatuses may be as shown in FIG. 5, and FIG. 5 is a schematic flow chart of a method according to Embodiment 3 of the present invention, which includes the following steps:

Step 51: An access router allocates an IP address of a PPP interface for an RHCP+DHCP client.

Step 52: The RHCP+DHCP client configures a received IP address allocated by the access router to be the IP address of the PPP interface.

As for the details of step 51 and step 52, reference may be made to the content of step 31 and step 32.

Step 53: An RHCP server generates a detection IP packet.

The detection IP packet carries a maintenance IP address allocated by the RHCP server for the RHCP+DHCP client, a gateway IP address, a network mask, and an IP address of a DHCP server.

Step 54: The RHCP server transmits the detection IP packet to the access router.

Step 55: The access router buffers the received detection IP packet.

Step 56: The access router forwards the detection IP packet to an RHCP+DHCP client through the PPP interface.

As for the details of step 54 to step 56, reference may be made to the content of step 34 to step 36 in the foregoing embodiment.

Step 57: The RHCP+DHCP client obtains the maintenance IP address from the RHCP server, and configures the maintenance IP address to be a temporary maintenance IP address.

Step 58: The RHCP+DHCP client transmits a transmission stop indication to the RHCP server, so that the RHCP server stops transmitting the detection IP packet to the client after receiving the transmission stop indication.

As for the details of step 58, reference may be made to the content of step 38.

Step 59: The RHCP+DHCP client adopts a unicast DHCP process to obtain a formal maintenance IP address from the DHCP server.

For example, when the RHCP+DHCP client and the DHCP server are in the same network segment, a DHCP discovery packet may be transmitted to the DHCP server according to the IP address of the DHCP server, in which the DHCP discovery packet carries an ID of the RHCP+DHCP client. The DHCP server allocates a formal maintenance IP address according to the ID of the client after receiving the DHCP discovery packet, and performs a normal DHCP process. When the RHCP+DHCP client and the DHCP server are not in the same network segment, the DHCP discovery packet may be transmitted to the DHCP server through a gateway according to the gateway IP address and the IP address of the DHCP server, in which the DHCP discovery packet carries the ID of the RHCP+DHCP client. The DHCP server allocates the formal maintenance IP address according to the ID of the client after receiving the DHCP discovery packet, and performs the normal DHCP process. The ID of the RHCP+DHCP client may be a unique physical ID of the client, such as an Electronic Serial Number (ESN).

After the RHCP+DHCP client obtains the formal maintenance IP address, the RHCP+DHCP client may release the temporary maintenance IP address, and a server having an RHCP function may recover the temporary maintenance IP address, so that the temporary maintenance IP address may still be used subsequently.

In this embodiment, the RHCP process and the DHCP process are combined to implement the allocation of the maintenance IP address, and the DHCP process is further performed on the basis of the RHCP process, which thereby ensures the accuracy of the allocated maintenance IP address.

Figure 6:
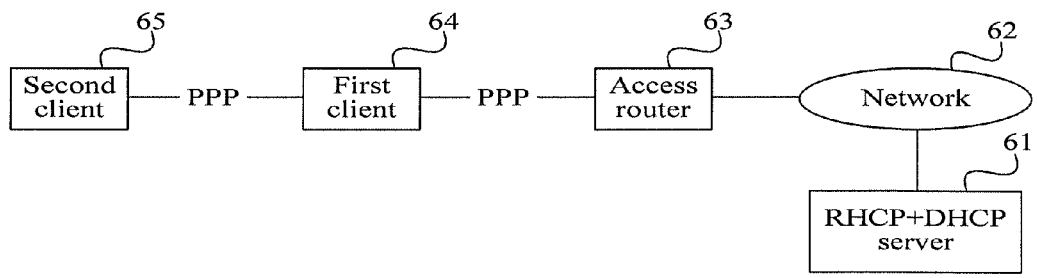
FIG. 6 is a schematic structural diagram of a system used in Embodiment 4 of the present invention.

FIG. 6 is a schematic structural diagram of a system applied in Embodiment 4 of the present invention, which includes an RHCP+DHCP server 61 as a remote server, a network 62, an access router 63, a first client 64, and a second client 65. The first client 64 is an RHCP+DHCP client, and the second client 65 may be an RHCP client or the RHCP+DHCP client. The first client 64 is an upper-level client of the second client 65, and the second client 65 accesses the first client 64 by using a PPP. In this embodiment, the RHCP server and the DHCP server are, for example, different physical entities, and it may be understood that, the RHCP server and the DHCP server may also be the same physical entity. In FIG. 6, a first client is taken as an example, and it may be understood that, a plurality of clients may be connected to the access router.

Figure 7:
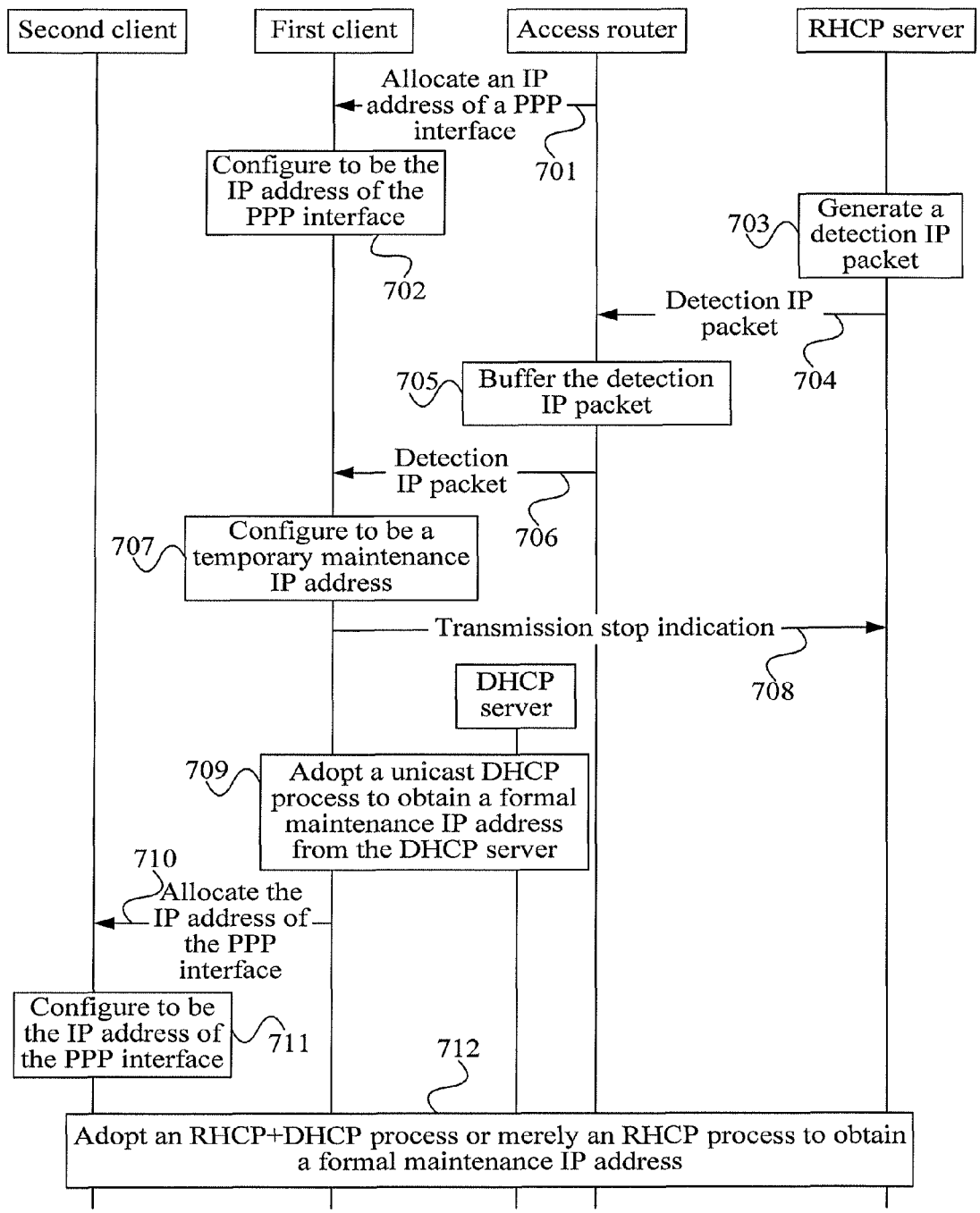
FIG. 7 is a schematic flow chart of a method according to Embodiment 4 of the present invention.

An interaction flow between the foregoing apparatuses may be as shown in FIG. 7, and FIG. 7 is a schematic flow chart of a method according to Embodiment 4 of the present invention, which includes the following steps:

Step 701: An access router allocates an IP address of a PPP interface for a first client.

Step 702: The first client configures a received IP address allocated by the access router to be the IP address of the PPP interface.

Step 703: An RHCP server generates a detection IP packet.

The detection IP packet carries a maintenance IP address allocated by the RHCP server for the RHCP+DHCP client, a gateway IP address, a network mask, and an IP address of the DHCP server.

Step 704: The RHCP server transmits the detection IP packet to the access router.

Step 705: The access router buffers the received detection IP packet.

Step 706: The access router forwards the detection IP packet to the first client through the PPP interface.

Step 707: The first client obtains the maintenance IP address from the RHCP server, and configures the maintenance IP address to be a temporary maintenance IP address.

Step 708: The first client transmits a transmission stop indication to the RHCP server, so that the RHCP server stops transmitting the detection IP packet to the client after receiving the transmission stop indication.

Step 709: The first client adopts a unicast DHCP process to obtain a formal maintenance IP address from the DHCP server.

As for the details of step 701 to step 709, reference may be made to the content of step 51 to step 59 in the foregoing embodiment.

Step 710: The first client allocates the IP address of the PPP interface for a second client.

The first client may allocate the IP address of the PPP interface after negotiating with the second client, or the first client may also allocate the IP address of the PPP interface according to an indication of the remote server.

Step 711: The second client configures the IP address allocated by the first client to be the IP address of the PPP interface.

Step 712: The second client adopts an RHCP+DHCP process or merely an RHCP process to obtain a formal maintenance IP address.

When the second client adopts the RHCP process, as for the details, reference may be made to the content of step 33 to step 38 in the foregoing embodiment.

When the second client adopts the RHCP+DHCP process, as for the details, reference may be made to the content of step 51 to step 59 in the foregoing embodiment. For example, the second client first obtains the temporary IP address and the IP address of the DHCP server through the RHCP process, and then uses the temporary IP address as a source IP address, the IP address of the DHCP server as a destination address, and the IP address of the second client as a next hop IP address, so as to transmit a DHCP discovery packet to the DHCP server, in which the DHCP discovery packet carries an ID of the client, and the DHCP server may allocate the IP address for the second client according to the ID of the client after receiving the discovery packet.

It may be understood that, when the second client is continuously cascaded to the client subsequently, the second client may allocate an interface IP address for a lower-level client of the second client, and forward the IP detection packet from the remote server, so that a cascaded client obtains the IP address allocated by the remote server.

In this embodiment, the upper-level client allocates the interface IP address for the lower-level client, so that the remote server may allocate the maintenance IP addresses for two or more cascaded clients. This embodiment may be applied in a scenario where the lower-level client accesses the upper-level client by using the PPP.

Figure 8:
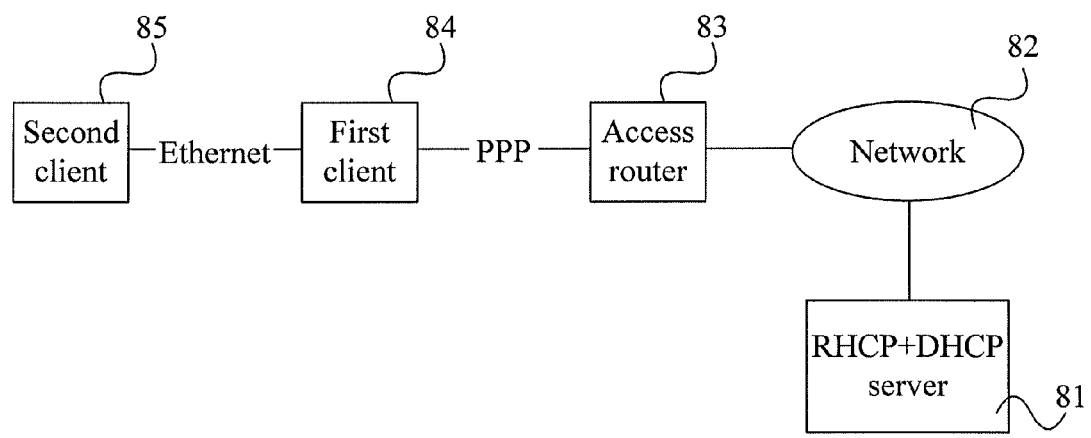
FIG. 8 is a schematic structural diagram of a system used in Embodiment 5 of the present invention.

FIG. 8 is a schematic structural diagram of a system applied in Embodiment 5 of the present invention, which includes an RHCP+DHCP server 81 as a remote server, a network 82, an access router 83, a first client 84, and a second client 85. The first client 84 is an RHCP+DHCP client, and the second client 85 is a DHCP client. The first client 84 is an upper-level client of the second client 85, and the second client 85 accesses the first client 84 through the Ethernet. In this embodiment, the RHCP server and the DHCP server are, for example, different physical entities, and it may be understood that, the RHCP server and the DHCP server may also be the same physical entity. In FIG. 8, a first client is taken as an example, and it may be understood that, a plurality of clients may be connected to the access router.

In this embodiment, the second client is cascaded to the first client through the Ethernet, and has a function of the DHCP client. A DHCP relay is configured at an Ethernet interface of the first client.

Figure 9:
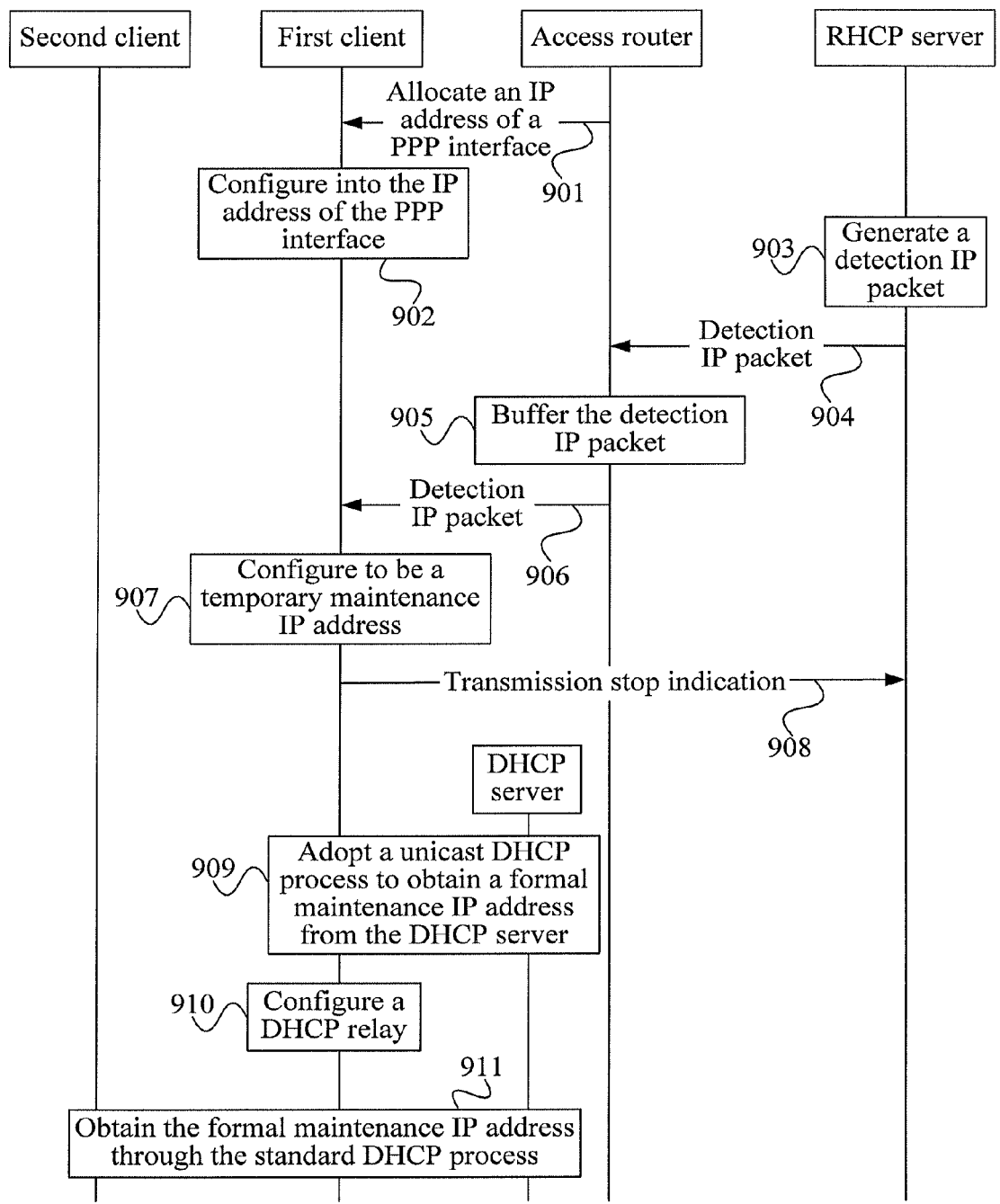
FIG. 9 is a schematic flow chart of a method according to Embodiment 5 of the present invention.

An interaction flow between the foregoing apparatuses is as shown in FIG. 9.

FIG. 9 is a schematic flow chart of a method according to Embodiment 5 of the present invention, which includes the following steps:

Step 901: An access router allocates an IP address of a PPP interface for a first client.

Step 902: The first client configures a received IP address allocated by the access router to be the IP address of the PPP interface.

Step 903: The RHCP server generates a detection IP packet.

The detection IP packet carries a maintenance IP address allocated by the RHCP server for the RHCP+DHCP client, a gateway IP address, a network mask, and an IP address of the DHCP server.

Step 904: The RHCP server transmits the detection IP packet to the access router.

Step 905: The access router buffers a received detection IP packet.

Step 906: The access router forwards the detection IP packet to the first client through the PPP interface.

Step 907: The first client obtains the maintenance IP address from the RHCP server, and configures the maintenance IP address to be a temporary maintenance IP address.

Step 908: The first client transmits a transmission stop indication to the RHCP server, so that the RHCP server stops transmitting the detection IP packet to the client after receiving the transmission stop indication.

Step 909: The first client adopts a unicast DHCP process to obtain a formal maintenance IP address from the DHCP server.

As for the details of step 901 to step 909, reference may be made to the content of step 51 to step 59 in the foregoing embodiment.

Step 910: The first client configures an Ethernet port for the second client, and configures a DHCP relay at the Ethernet port.

When the Ethernet port is configured, a three-layer IP interface of an Ethernet interface and routing information may be configured, for example, an interface IP address, network segment information, and a routing table are configured according to an actual situation.

The first client may store DHCP configuration information in advance, which is adapted to configure the DHCP relay.

Step 911: The second client obtains a formal maintenance IP address through the DHCP process.

Specifically, the second client may transmit a DHCP discovery packet to the DHCP server through the DHCP relay, and the DHCP server allocates the formal maintenance IP address after receiving the DHCP discovery packet, and transmits the formal maintenance IP address to the second client through the DHCP relay.

It may be understood that, when the second client is cascaded to the client subsequently, the second client may still allocate, according to different access manners of subsequently cascaded client, the interface IP address for a lower-level client of the second client or configure the DHCP relay.

For example, when the lower-level client of the second client accesses the second client by using the PPP, the second client executes the flow in Embodiment 4 with reference to the first client in Embodiment 4. When the lower-level client of the second client accesses the second client through the Ethernet, the second client executes the flow in this embodiment with reference to the first client in this embodiment.

In this embodiment, an upper-level client allocates the DHCP relay for the lower-level client, so that the remote server may allocate the maintenance IP addresses for two or more cascaded clients. This embodiment may be applied in a scenario where the lower-level client accesses the upper-level client through the Ethernet.

Figure 10:
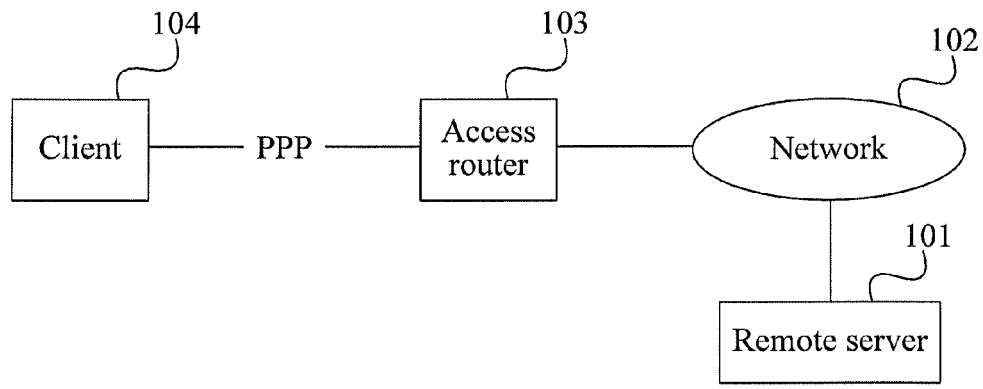
FIG. 10 is a schematic structural diagram of a system used in Embodiment 6 of the present invention.

FIG. 10 is a schematic structural diagram of a system applied in Embodiment 6 of the present invention, which includes a remote server 101, a network 102, an access router 103, and a client 104. The remote server 101 may be an RHCP server or an RHCP+DHCP server, and the client 104 may adopt many maintenance IP address configuration schemes, for example, an RHCP scheme (or an RHCP+DHCP scheme) provided by the embodiment of the present invention, a local configuration scheme, or other configuration schemes. In FIG. 10, a client is taken as an example, and it may be understood that, a plurality of clients may be connected to the access router.

Figure 11:
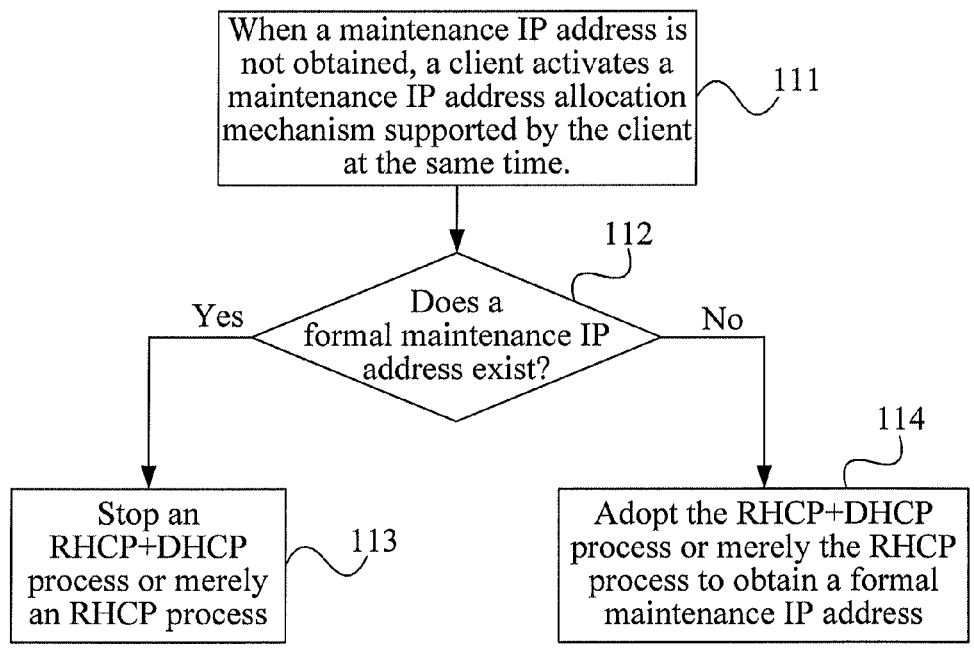
FIG. 11 is a schematic flow chart of a method according to Embodiment 6 of the present invention.

An interaction flow between the foregoing apparatuses is as shown in FIG. 11.

FIG. 11 is a schematic flow chart of a method according to Embodiment 6 of the present invention, which includes the following steps.

Step 111: When a maintenance IP address is not obtained, a client activates a maintenance IP address allocation mechanism supported by the client.

For example, the maintenance IP address allocation mechanism supported by the client includes an RHCP+DHCP scheme and a local configuration scheme, and the RHCP+DHCP scheme and the local configuration scheme are activated.

Step 112: The client judges whether a formal maintenance IP address exists, if the formal maintenance IP address exists, step 113 is performed, and if the formal maintenance IP address does not exist, step 114 is performed.

For example, if the RHCP+DHCP scheme is adopted, after the client obtains the maintenance IP address allocated by the DHCP server, the client indicates that the formal maintenance IP address exists; and if the RHCP scheme is adopted, after the client obtains the maintenance IP address allocated by the RHCP server, the client indicates that the formal maintenance IP address exists; or the client adopts the local configuration scheme to obtain the maintenance IP address which is also the formal maintenance IP address.

Step 113: The client stops an RHCP+DHCP process or merely an RHCP process.

For example, if the RHCP+DHCP scheme is adopted, the RHCP+DHCP process is stopped; and if merely the RHCP scheme is adopted, the RHCP process is merely stopped.

Step 114: The client adopts the RHCP+DHCP process or merely the RHCP process to obtain the formal maintenance IP address.

For example, if the RHCP+DHCP scheme is adopted, Embodiment 3 as shown in FIG. 5 is employed; and if merely the RHCP scheme is adopted, Embodiment 2 as shown in FIG. 3 is employed.

It may be understood that, when the client is further cascaded to a lower-level client, Embodiment 4 or Embodiment 5 may also be executed according to an actual situation.

In this embodiment, in the case that the client does not have the formal maintenance IP address, the allocation method provided by the embodiment of the present invention is adopted, which thereby avoids repeated allocation of an address, and ensures compatibility of various maintenance IP address allocation schemes.

To sum up, when a current base station uses an IP technology for networking, a PPP technology is usually used. Through the embodiments of the present invention, when a base station is connected to a router through the PPP, the base station may remotely and automatically obtain the IP address, which thereby facilitates the networking. In addition, local configuration of the IP address may be prevented at the base station, which lowers the cost. Moreover, compared with the local configuration of the IP address at the base station, the remote and automatic obtaining of the IP address also improves the network security.

The embodiments of the present invention may be applied in different IP networks such as a radio network or a fixed network.

Figure 12:
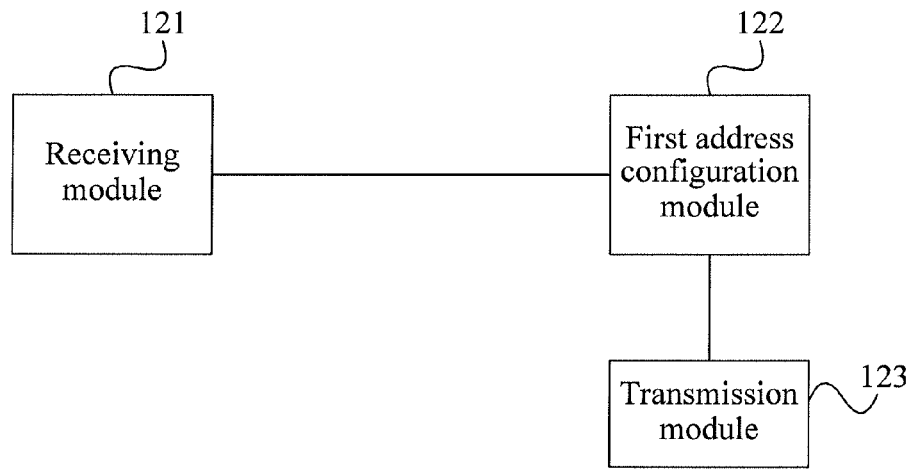
FIG. 12 is a schematic structural diagram of an apparatus according to Embodiment 7 of the present invention.

FIG. 12 is a schematic structural diagram of an apparatus according to Embodiment 7 of the present invention. The apparatus is applied for executing the foregoing method, which is located in a first client and includes a receiving module 121 and a first address configuration module 122. The receiving module 121 is configured to receive a first detection IP packet from a remote server through a PPP interface, in which the first detection IP packet carries a first IP address allocated by the remote server for the first client. The first address configuration module 122 is configured to configure the first IP address to be an IP address of the first client.

In addition, the apparatus of this embodiment may include a transmission module 123, configured to transmit a transmission stop indication to the remote server after the IP address is configured, so that the remote server stops transmitting the first detection IP packet to the first client after receiving the transmission stop indication.

In this embodiment, a destination IP address of the detection IP packet may be an IP address allocated for the server.

In this embodiment, through an RHCP process, the remote server generates the detection IP packet, so that the client obtains the IP address from the detection IP packet, which therefore implements remote configuration of the IP address.

Figure 13:
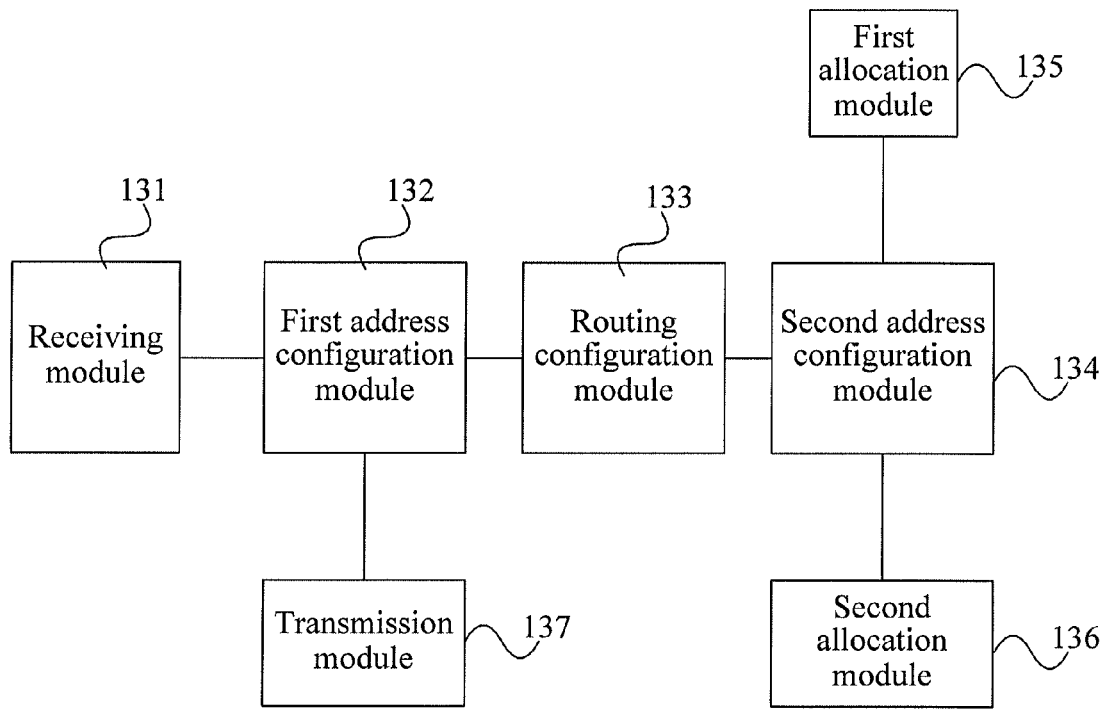
FIG. 13 is a schematic structural diagram of an apparatus according to Embodiment 8 of the present invention.

FIG. 13 is a schematic structural diagram of an apparatus according to Embodiment 8 of the present invention. The apparatus is applied for executing the foregoing method, and includes a receiving module 131, a first address configuration module 132, a routing configuration module 133, and a second address configuration module 134. This embodiment may be applied in a scenario where an RHCP process and a DHCP process are required.

The receiving module 131 is configured to receive a first detection IP packet from a remote server through a PPP interface, in which the first detection IP packet carries a first IP address allocated by the remote server for the first client, and further carries routing information and an IP address of the DHCP server, so as to obtain the IP address from the DHCP server. The first address configuration module 132 is configured to configure the first IP address to be an IP address of the first client, and substantially, the first IP address is a configured temporary IP address used for communicating with the DHCP server. The routing configuration module 133 is configured to configure the routing information of the first client according to the routing information of the first detection IP packet, so that the first client communicates with the DHCP server, and obtains the IP address from the DHCP server. The second address configuration module 134 is configured to use a unicast DHCP to obtain a second IP address from the DHCP server, and configure the second IP address to be the IP address of the first client, in which the IP address obtained from the DHCP server is a formal IP address of the client. Further, when the apparatus of this embodiment is cascaded to a second client, the apparatus further includes a first allocation module 135 or a second allocation module 136. The first allocation module 135 is configured to allocate an IP address of a PPP interface for the second client, and forward a second detection IP packet generated by the remote server to the second client through the IP address of the PPP interface allocated by the second client, so that the second client obtains a second IP address of the second client according to the second detection IP packet. The second allocation module 136 is configured to configure an Ethernet interface for the second client, and configure a DHCP relay at the Ethernet interface, so that the second client obtains the second IP address of the second client through the DHCP relay.

In addition, the apparatus of this embodiment may also include a transmission module 137, configured to transmit a transmission stop indication to the remote server after the IP address is configured, so that the remote server stops transmitting the first detection IP packet to the first client after receiving the transmission stop indication.

In this embodiment, a destination IP address of the detection IP packet is an IP address allocated for the remote server.

In this embodiment, the RHCP process and the DHCP process are combined to implement the allocation of the IP address, and the DHCP process is further performed on the basis of the RHCP process, which thereby ensures the accuracy of the allocated IP address.

It should be noted that, sequence numbers, such as "first" and "second", in the embodiments of the present invention are merely for distinguishing the embodiments, and do not imply the preference among the embodiments.

Persons skilled in the art may understand that all or a part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be any medium that is capable of storing program codes, such as a Read-Only Memory (ROM), a Random Access Memory (RAM), a magnetic disk, or an optical disk.

Finally, it should be noted that the above embodiments are merely provided for describing the technical solutions of the present invention, but not intended to limit the present invention. It should be understood by persons skilled in the art that although the present invention has been described in detail with reference to the embodiments, modifications may be made to the technical solutions described in the embodiments, or equivalent replacements may be made to some of the technical features, as long as such modifications or replacements do not depart from the spirit and protection scope of the present invention.

What is claimed is:

1. A method for obtaining a remote Internet Protocol (IP) address, comprising:

receiving, by a first client, a first detection IP packet from a remote server through a Point to Point Protocol (PPP) interface with an access router, wherein the remote server obtains routing information of the first client in advance and the first detection IP packet comprises a first IP address allocated by the remote server for the first client using a Remote Host Configuration Protocol (RHCP), wherein the remote server is a RHCP server and the first client is a RHCP client having a lower-level client cascaded to the first client through an Ethernet connection, wherein the first detection IP packet is forwarded by the access router to the first client using a pre-configured routing table that maps a corresponding relation between a temporary maintenance IP address and a client ID or an IP address of the PPP interface, and the first IP address included in the routing information allocated by the remote server is the temporary maintenance IP address that enables the remote server to stop subsequent transmission of the first detection IP packet for the first client through at least the steps of:

using the obtained routing information of the first client from the remote server and the temporary maintenance IP to configure the first client to obtain a formal maintenance IP address sent by the remote server;

releasing the temporary maintenance IP address after the formal maintenance IP address is allocated and sent by the remote server and is obtained by the first client; and configuring the first IP address to be an IP address of the first client.

2. The method according to claim 1, wherein the first detection IP packet further comprises an IP address of a Dynamic Host Configuration Protocol (DHCP) server, the method further comprising:

using, by the first client, a unicast DHCP to obtain a second IP address from the DHCP server; and configuring the second IP address to be the IP address of the first client.

3. The method according to claim 1, wherein the first client is cascaded to a second client, the method further comprising one of the following:
- allocating, by the first client, an IP address of the PPP interface for the second client, and forwarding a second detection IP packet generated by the remote server to the second client through the IP address of the PPP interface allocated for the second client, so that the second client obtains a second IP address of the second client according to the second detection IP packet; and
- configuring, by the first client, an Ethernet interface for the second client, and configuring a Dynamic Host Configuration Protocol DHCP relay at the Ethernet interface, so that the second client obtains an IP address allocated by the remote server through the DHCP relay.

4. The method according to claim 1, further comprising:
- transmitting, by the first client, a transmission stop indication to the remote server after configuring an IP address, so that the remote server stops transmitting the first detection IP packet to the first client after receiving the transmission stop indication.

5. The method according to claim 1, further comprising:
- allocating, by an access router, an IP address of the PPP interface for the first client; and
- forwarding, by the access router, the first detection IP packet from the remote server, to the first client according to a routing table, wherein the routing table stores a corresponding relation between the IP address allocated by the remote server and the IP address of the PPP interface.

6. A first client comprising a computer program product for obtaining a remote Internet Protocol (IP) address, the computer program product comprising a non-transitory computer readable storage medium having instructions stored therein executed by a processor that configure the first client to:
- receive a first detection IP packet from a remote server through a Point to Point Protocol (PPP) interface with an access router, wherein the remote server obtains routing information of the first client in advance and the first detection IP packet comprises a first IP address allocated by the remote server for the first client using a Remote Host Configuration Protocol (RHCP), wherein the remote server is a RHCP server and the first client is a RHCP client having a lower-level client cascaded to the first client through an Ethernet connection, wherein the first detection IP packet is forwarded by the access router to the first client using a preconfigured routing table that maps a corresponding relation between a temporary maintenance IP address and a client ID or an IP address of the PPP interface, wherein the first IP address included in the routing information allocated by the remote server is the temporary maintenance IP address that enables the remote server to stop subsequent transmission of the first detection IP package for the first client, and the remote server allocates a formal maintenance IP address;
- use the obtained routing information of the first client sent by the remote server and the temporary maintenance IP to configure the first client to obtain the formal maintenance IP address sent by the remote server; and
- configure the first IP address to be an IP address of the first client and releases the temporary maintenance IP address after the formal maintenance IP address is obtained.

7. The first client according to claim 6, wherein the first detection IP packet further comprises an IP address of a Dynamic Host Configuration Protocol (DHCP) server, the first client further configured to:
- use a unicast DHCP to obtain a second IP address from the DHCP server, and configure the second IP address to be an IP address of the first client.

8. The first client according to claim 6, wherein the first client is cascaded to a second client, the first client further configured to perform one of the following:
- allocate an IP address of the PPP interface for the second client, and forward a second detection IP packet generated by the remote server to the second client through the IP address of the PPP interface allocated for the second client, so that the second client obtains a second IP address of the second client according to the second detection IP packet; and
- configure an Ethernet interface for the second client, and configure a Dynamic Host Configuration Protocol DHCP relay at the Ethernet interface, so that the second client obtains the second IP address of the second client through the DHCP relay.

9. The first client according to claim 6, the first client further configured to:
- transmit a transmission stop indication to the remote server after an IP address is configured, so that the remote server stops transmitting the first detection IP packet to the first client after receiving the transmission stop indication.

* * * * *